United States Patent
Maani et al.

(10) Patent No.: US 8,908,755 B2
(45) Date of Patent: Dec. 9, 2014

(54) MULTI-PARAMETER MOTION FOR EFFICIENT PREDICTION IN VIDEO COMPRESSION

(75) Inventors: Ehsan Maani, San Jose, CA (US); Wei Liu, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 13/176,124

(22) Filed: Jul. 5, 2011

(65) Prior Publication Data

US 2012/0014452 A1 Jan. 19, 2012

Related U.S. Application Data

(60) Provisional application No. 61/365,306, filed on Jul. 16, 2010.

(51) Int. Cl.
- *H04N 7/12* (2006.01)
- *H04N 19/51* (2014.01)
- *H04N 19/46* (2014.01)
- *H04N 7/50* (2006.01)

(52) U.S. Cl.
CPC ..... *H04N 19/0084* (2013.01); *H04N 19/00696* (2013.01); *H04N 19/00545* (2013.01)
USPC ....................................................... 375/240

(58) Field of Classification Search
USPC ....................................................... 375/240
See application file for complete search history.

(56) References Cited

U.S. PATENT DOCUMENTS

| | | | | |
|---|---|---|---|---|
| 6,807,231 B1 * | 10/2004 | Wiegand et al. | ......... | 375/240.12 |
| 7,295,614 B1 * | 11/2007 | Shen et al. | ............... | 375/240.25 |
| 7,400,681 B2 * | 7/2008 | Joch et al. | ................ | 375/240.16 |
| 7,499,495 B2 * | 3/2009 | Srinivasan | ............... | 375/240.16 |
| 7,529,302 B2 * | 5/2009 | Mukerjee et al. | ........ | 375/240.15 |
| 7,577,198 B2 * | 8/2009 | Holcomb | ................. | 375/240.13 |
| 2004/0258156 A1 * | 12/2004 | Chujoh et al. | ........... | 375/240.16 |
| 2006/0268166 A1 * | 11/2006 | Bossen et al. | ............. | 348/390.1 |
| 2007/0064809 A1 * | 3/2007 | Watanabe et al. | ........ | 375/240.16 |
| 2009/0034854 A1 | 2/2009 | Lee et al. | | |
| 2009/0067505 A1 * | 3/2009 | Tourapis et al. | ......... | 375/240.16 |
| 2011/0211640 A1 * | 9/2011 | Kim et al. | ................ | 375/240.16 |
| 2011/0274175 A1 * | 11/2011 | Sumitomo | ............... | 375/240.16 |
| 2011/0317930 A1 * | 12/2011 | Kim et al. | ..................... | 382/233 |
| 2013/0279819 A1 * | 10/2013 | Kim et al. | ..................... | 382/233 |

FOREIGN PATENT DOCUMENTS

WO     0237859 A2     5/2002

OTHER PUBLICATIONS

Markus Flierl et al., "Multihypothesis Pictures for H.26L", Proc. ICIP, Thessaloniki, Greece, Oct. 2001.
Bernd Girod et al., "Multi-Frame Motion-Compensated Video Compression for the Digital Set-Top Box", ICIP 2002, Sep. 2002, pp. 1-4.
Markus Flierl et al., "Rate-Constrained Multihypothesis Prediction for Motion-Compensated Video Compression", IEEE Transactions on Circuits and System for Video Technology, vol. 12, No. 11 Nov. 2002, pp. 957-969.

* cited by examiner

*Primary Examiner* — Sath V Perungavoor
*Assistant Examiner* — Howard D Brown, Jr.
(74) *Attorney, Agent, or Firm* — Haverstock & Owens LLP

(57) ABSTRACT

Motion Compensated Prediction (MCP) has been a key factor in most advanced video compression schemes. For further reduction in the residual signal energy in B-frames, bidirectional prediction where two motion-compensated signals are superimposed has also been utilized in most prior video coding standards such as MPEG-2 or MPEG-4/AVC. Syntax changes and appropriate motion vector prediction that allows efficient use of multi-parameter MCP is described. The prediction signal is constructed by linearly combining the motion-compensated signals from each parameter (or motion vector).

29 Claims, 4 Drawing Sheets

Neighbors of the current block C

Neighbors of the current block C

Fig. 1

$x$ : Context index for coding of MPM signaling bits

MULTI-PARAMETER MOTION FOR EFFICIENT PREDICTION IN VIDEO COMPRESSION

CROSS-REFERENCE TO RELATED APPLICATION(S)

This application claims priority under 35 U.S.C. §119(e) of the U.S. Provisional Patent Application Ser. No. 61/365,306, filed Jul. 16, 2010 and entitled, "MULTI-PARAMETER MOTION FOR EFFICIENT PREDICTION IN VIDEO COMPRESSION." The Provisional Patent Application Ser. No. 61/365,306, filed Jul. 16, 2010 and entitled, "MULTI-PARAMETER MOTION FOR EFFICIENT PREDICTION IN VIDEO COMPRESSION" is also hereby incorporated by reference in its entirety for all purposes.

FIELD OF THE INVENTION

The present invention relates to the field of image processing. More specifically, the present invention relates to inter coding of high definition videos.

BACKGROUND OF THE INVENTION

Advances in video codecs, such as MPEG-4/AVC use motion compensated prediction for inter coding. A decoder expects a motion vector for a specific block size and location. The motion vector pinpoints a location in the reference image (the previously coded image) which constructs the prediction for the current block. If the location appointed by the motion vector is not on the image grid (e.g. a fractional-pel), interpolation of the sample values is performed. Various fixed and adaptive interpolation techniques have been proposed. The resolution of the motion vectors is able to be arbitrary (up to $\frac{1}{12}$th pel has been proposed).

However, interpolation is often fixed and cannot adapt to local statistics. For example, for interpolation of a value in the middle of four sample values, the average of the four is often used. Nevertheless, the actual value of the location is able to be close to one or two of locations if an edge is passing through the sampling locations. In this case, the average interpolation is not accurate.

Multi-hypothesis prediction for motion-compensated prediction allows multiple motion vectors from different reference pictures for prediction of P-pictures. The prediction P of a block is constructed from N prediction blocks, each appointed by a motion vector $mv_i$, $i \in [1, \ldots, N]$, where $P_i$ is the prediction resulting from motion compensation using motion vector $mv_i$, and $w_i$ is the weight associated with it: $P = w_1 P_1 + w_2 P_2 + \ldots + w_N P_N$. For simplicity, it is assumed $w_i = 1/N$.

Prior work only applies to P-pictures.

SUMMARY OF THE INVENTION

Motion Compensated Prediction (MCP) has been a key factor in most advanced video compression schemes. For further reduction in the residual signal energy in B-frames, bidirectional prediction where two motion-compensated signals are superimposed has also been utilized in most prior video coding standards such as MPEG-2 or MPEG-4/AVC. Syntax changes and appropriate motion vector prediction that allows efficient use of multi-parameter MCP is described. The prediction signal is constructed by linearly combining the motion-compensated signals from each parameter (or motion vector).

In one aspect, a method of encoding an image using multi-parameter motion prediction programmed in a controller in a device comprises predicting a first motion vector from a list of motion vector predictors, predicting remaining motion vectors recursively using differential prediction and generating a bitstream containing the first motion vector and the remaining motion vectors. Using differential prediction includes computing motion vector differences. The first motion vector is selected in an RD-optimized fashion. If the list contains more than one motion vector, an index of the predictor is coded into the bitstream along with a motion vector difference. The remaining motion vectors include only remaining motion vector differences. The method further comprises ordering the motion vectors in the bitstream in an order to reduce an overhead from side information. All motion vectors use a same reference frame whose index is signaled for each list. A number of available motion vectors for each prediction unit is transmitted in the bitstream. A maximum number of motion vectors allowed is pre-defined and fixed. The multi-parameter motion uses multiple motion vectors from one image to construct a motion-compensated prediction image. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, an apparatus for encoding an image using multi-parameter motion prediction programmed in a controller in a device comprises a first prediction module for predicting a first motion vector from a list of motion vector predictors, a remaining prediction module for predicting remaining motion vectors recursively using differential prediction and a generating module for generating a bitstream containing the first motion vector and the remaining motion vectors. Using differential prediction includes computing motion vector differences. The first motion vector is selected in an RD-optimized fashion. If the list contains more than one motion vector, an index of the predictor is coded into the bitstream along with a motion vector difference. The remaining motion vectors include only remaining motion vector differences. The apparatus of further comprises an ordering module for ordering the motion vectors in the bitstream in an order to reduce an overhead from side information. All motion vectors use a same reference frame whose index is signaled for each list. A number of available motion vectors for each prediction unit is transmitted in the bitstream. A maximum number of motion vectors allowed is pre-defined and fixed. The multi-parameter motion uses multiple motion vectors from one image to construct a motion-compensated prediction image. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, a device comprises a memory for storing an application, the application for predicting a first motion vector from a list of motion vector predictors, predicting remaining motion vectors recursively using differential prediction and generating a bitstream containing the first motion vector and the remaining motion vectors and a processing component coupled to the memory, the processing component configured for processing the application. Using differential prediction includes computing motion vector differences. The first motion vector is selected in an RD-optimized fashion. If the list contains more than one motion vector, an index of the predictor is coded into the bitstream along with a motion vector difference. The remaining motion vectors include only remaining motion vector differences. The device further comprises ordering the motion vectors in the bitstream in an order to reduce an overhead from side information. All motion vectors use a same reference frame whose index is signaled for each list. A number of available motion vectors for each prediction unit is transmitted in the bitstream. A maximum number of motion vectors allowed is pre-defined and fixed. The multi-parameter motion uses multiple motion vectors from one image to construct a motion-compensated prediction image.

DETAILED DESCRIPTION OF THE PREFERRED EMBODIMENT

The syntax described herein allows multiple motion parameters for B-pictures in addition to P-pictures. This increases the number of possible combinations of parameters significantly. Since permitting multiple motion parameters per block is able to dramatically increase the number of bits due to the signaling of the side information, proper encoding of the side information is inevitable to observe good coding gain. This includes reduction of the overhead, efficient prediction of the side information and design of the syntax and the context for effective context-adaptive arithmetic coding (e.g. context adaptive binary arithmetic coding). An extension to multi-view video coding is also beneficial. Multiple motion vectors are able to be from different views. A prediction is made from a linear combination of the motion compensated predictions (regardless of the views the prediction came from).

To perform multi-parameter motion prediction, S is denoted as the list of the conventional motion vector predictors such as the motion vectors of the spatial and/or temporal neighbors. The first motion vector $mv_1$ is predicted using the conventional methods from the list S. The best motion vector predictor from the list is selected in an RD-optimized fashion. If the list S contains more than one motion vector, the index of the predictor is also coded into the bitstream along with the motion vector difference. The rest of the motion vectors $mv_i$, $i \in [2, 3, \ldots, N]$ are predicted either recursively (e.g. $mv_i$ is differentially predicted from $mv_{i-1}$) or from the same list S. Alternatively, the last encoded motion vector is able to be added to the list S, and the new list S is able to be used for prediction of the next motion vector. Assuming a recursive prediction of the motion vectors, the MV differences are computed as:

$$mvd_1 = mv_1 - pmv, pmv_e \text{ belongs to } S$$

$$mvd_i = mv_i - mv_{i-1}, i \text{ belongs to } [2,3, \ldots, N].$$

The prediction of the block constructed by the decoder is independent of the order of the motion vectors (as long as all N motion vectors are decoded correctly); however, the encoder should find the "good" order for the motion vector coding such that the overhead from the side information is reduced as much as possible.

Syntax Extensions

Signaling of motion parameters is done at a Prediction Unit (PU) level (e.g. the smallest unit for which a prediction is constructed). Similar to H.264/AVC, for B-slices, it is signaled to the decoder whether the current PU is predicted from LIST_0 (backward) or LIST_1 (forward) or both (bi-directional). For P-slices, only prediction from LIST_0 is possible. Unlike the prior art, all motion vectors use the same reference frame whose index is signaled (per LIST). Then, for each LIST: the first motion vector difference $dmv_1$ is coded into the bitstream using conventional methods. If the list of predictors has more than one element, the index of the predictor is also coded, and a "1" at the end of the first motion vector difference indicates to the decoder that another motion vector difference will follow. On the other hand, a "0" indicates that the motion vector parsing of current LIST (for the current block) is done.

The number of available motion vectors per PU is also transmitted in the bitstream and thus is efficiently coded. Truncated Unary binarization is used to represent the number of motion vectors N in binary. Thus, for the popular case that the maximum possible number of motion vectors is two, only 1 bit is transmitted, where a "0" signals to the decoder that only one motion vector is to follow and a "1" signals two motion vectors. Even in the case of two motion vectors, this signaling is different from prior art (e.g., H.264/AVC) since in H.264/AVC, two reference frame indices are also transmitted when two motion vectors are present (regardless of the LIST).

Figure 1:
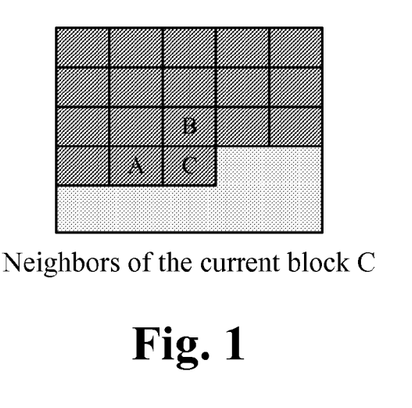
FIG. 1 illustrates a diagram of neighbors of a current block according to some embodiments.
Figure 2:
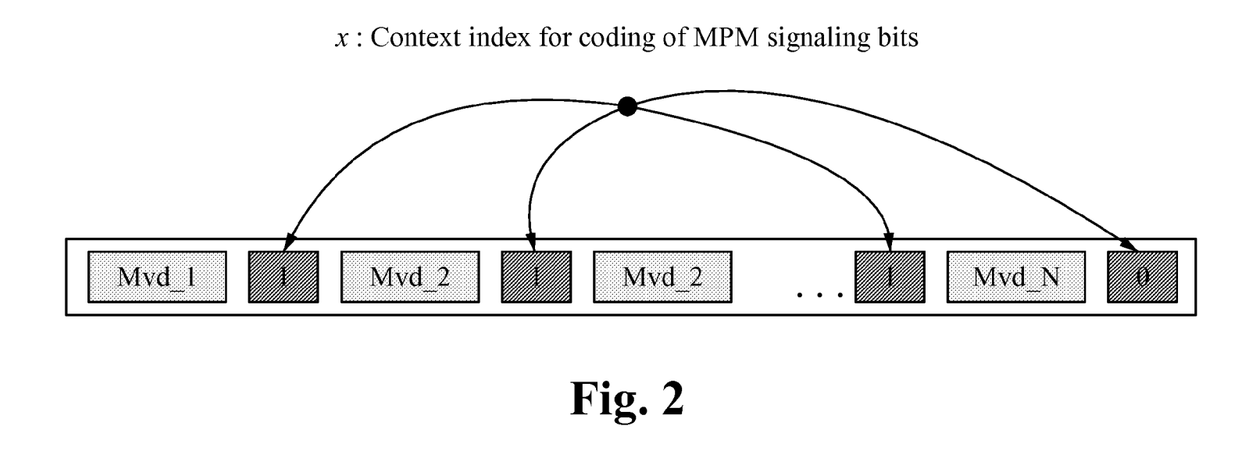
FIG. 2 illustrates a diagram for coding multi-parameter motion prediction signaling bits according to some embodiments.

Since PUs with multiple motion parameters often appear together in a picture, the number of MVs of neighboring blocks are used as a context in coding of the bit that signals whether to terminate MV parsing or not. The index of the three contexts defined is given by:

$$\chi = ((\text{NumberOfMVs}(A) == 1)?0:1) + ((\text{NumberOfMVs}(B) == 1)?0:1),$$

where A and B are neighbors to the left and top of the block to be coded as shown in FIG. 1. $\chi$ is the context index for coding of MPM signaling bits as shown in FIG. 2.

For a block or PU, up to N motion vectors are allowed per list. N is a pre-defined fixed number which is hard-wired in to the decoder. The prediction signal is constructed by a linear combination of the motion compensated prediction from each motion vector. To simplify the encoder motion search and allow a better prediction of the motion vectors, all motion vectors of the same list from one reference frame are restricted. The proposed syntax changes and motion vector prediction for one list prediction case is described. In the case for B-pictures where two lists (forward and backward) are generally present, each list uses the described syntax separately from the other.

Let pmv be the current motion vector predictor, e.g. the spatial or temporal motion vector predictor for the block to be coded. Furthermore, let $S = \{mv_1, mv_2, \ldots, mv_M\}$, $M \leq N$, be the set of all motion vectors selected for the current block (a non-skip block). In addition, let π(i)=j to be the position of the ith motion vector when written to the bit stream. In other words, it is a permutation of the set {1, 2, ..., M} which determines the order in which motion vectors of the current block are written into the bit stream. Then, the motion vector differences are calculated according to $$\delta mv_i = mv_{\pi(i)} - mv_{(i-1)}, i = 1, 2, \ldots, M, \quad (1)$$

where $\pi(0)$ and $mv_0 = pmv$.

Once motion vector differences are computed, then they are encoded into the bit stream in the following way: first, the index of the reference frame that these motion vectors point to is binarized and coded in the bitstream. This follows by the first motion vector difference $\delta mv_1$. Then, a one bit flag is added to signal to the decoder whether this motion vector difference was the last one or more motion vector differences will follow. In this case, a 1 is transmitted to signal the existence of another motion vector difference. Next, the second motion vector difference is binarized and coded into the bitstream. This process continues until $\delta mv_M$ is coded. If M<N, a 0 is transmitted next indicate the termination of the motion vector parsing process to the decoder. Otherwise, no extra bits are transmitted and the decoder terminates the parsing process due to prior knowledge of the maximum number of motion vectors. Since the motion vectors are differentially coded, the number of bits to transmit the entire set S also depends on the permutation π as well as the spatial/temporal predictor pmv.

Figure 3:
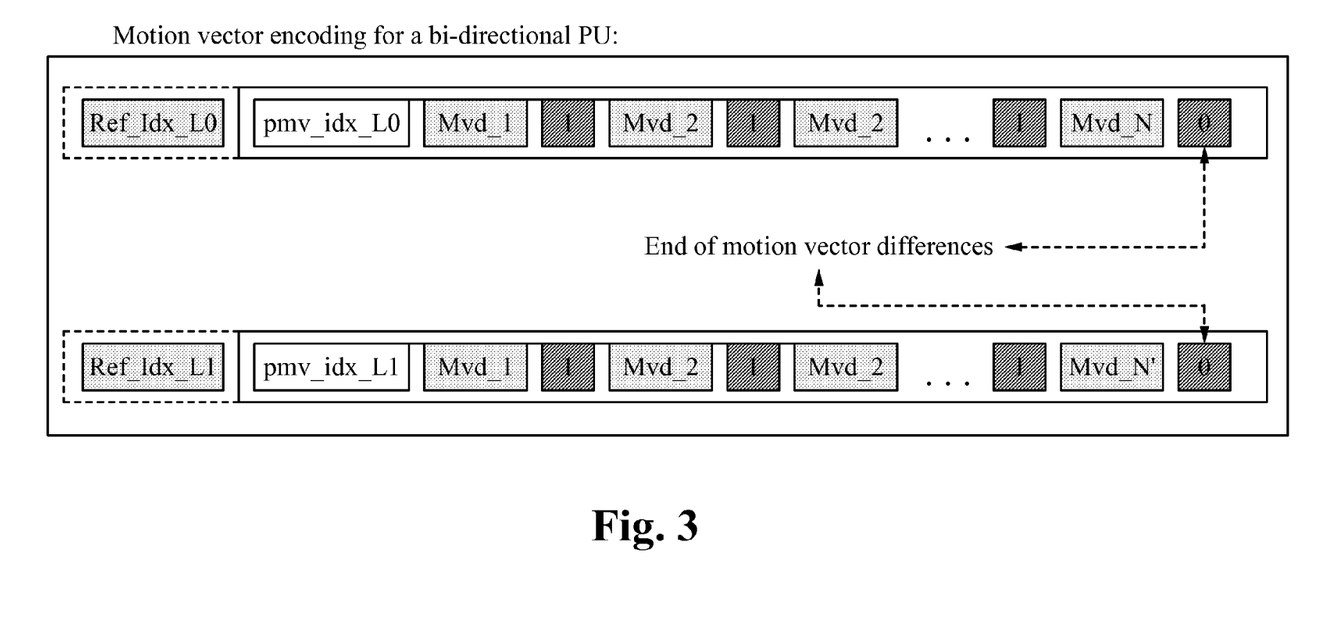
FIG. 3 illustrates a diagram of motion vector encoding for a bi-directional prediction unit according to some embodiments.

The coding of the last MV difference flags as shown in FIG. 3 employs several new contexts of CABAC. The first flag which appears after the first MV difference employs three contexts based on the same flag in the spatial neighbors (top and left blocks) of the current block. The rest of the flags share one context.

The multi-parameter motion technique is able to achieve up to 20% bit-rate reduction at the same quality when compared to the conventional single parameter motion methods such as the one used in H.264/AVC.

Example

The algorithm has been implemented with N=2. Motion vectors of a block are jointly optimized. Since the order of the motion vectors also has an impact on the RD cost, the best order of the MVs is selected for improved performance. A maximum calibration unit size is 64 with a depth of 4. Internal bit-depth increase is 4. Additional tools are used in the example: arbitrary intra direction, DCT-based interpolation filter with 12 taps for luna and 6 taps for chroma and rate-distortion optimized quantization. Other tools are turned off unless specified. Five different Quantization Parameters for intra pictures (QPIs) (22, 26, 30, 34, 38) are considered to compute the average bit rate reduction for the low and high bit rate ranges. QPP (QP for P-Slices) is set to QPI+1. Approximately, two seconds of video is considered for all test sequences. The exact number of frames is reported in Table 1. The bit savings resulted from the new syntax changes for various resolutions and test sequences are listed in Table 2.

TABLE 1

Sequences and frame numbers used in experiments.

| Class | Sequence | Start Frame | Frames to be Encoded |
|---|---|---|---|
| B1 | Kimono | 116 | 49 |
|  | ParkScene | 0 | 49 |
| B2 | Cactus | 0 | 97 |
|  | BasketballDrive | 0 | 97 |
|  | BQTerrace | 0 | 129 |

TABLE 1-continued

Sequences and frame numbers used in experiments.

| Class | Sequence | Start Frame | Frames to be Encoded |
|---|---|---|---|
| C | BasketballDrill | 0 | 97 |
|  | BQMall | 0 | 129 |
|  | PartyScene | 0 | 97 |
|  | RaceHorses | 0 | 65 |
| D | BasketballPass | 0 | 97 |
|  | BQSquare | 0 | 129 |
|  | BlowingBubbles | 0 | 97 |
|  | RaceHorses | 0 | 65 |
| E | Vidyo1 | 0 | 129 |
|  | Vidyo3 | 0 | 129 |
|  | Vidyo4 | 0 | 129 |

Table 2 lists these bit rate reductions for various resolutions and test sequences.

TABLE 2

Average bit rate reduction of various test sequences/resolutions.

| Sequence/Resolution | | BD rate Low % | BD rate High % |
|---|---|---|---|
| E | Vidyo1 | −8.26 | −14.57 |
|  | Vidyo3 | −8.93 | −13.34 |
|  | Vidyo4 | −8.59 | −15.30 |
| Class E Average | | −8.59 | −14.40 |
| Class D | Basketball Pass | −5.35 | −5.88 |
|  | Blowing Bubbles | −2.83 | −4.21 |
|  | BQ Square | −12.86 | −14.12 |
|  | Race Horses | −2.64 | −2.91 |
| Class D Average | | −5.92 | −6.78 |
| Class C | Basketball Drill | −6.20 | −6.86 |
|  | BQ Mall | −7.40 | −9.44 |
|  | Party Scene | −4.94 | −7.19 |
|  | Race Horses | −4.47 | −5.26 |
| Class C Average | | −5.75 | −7.19 |
| B | Basketball Drive | −8.56 | −10.62 |
|  | BQ Terrace | −34.36 | −25.15 |
|  | Cactus | −7.67 | −10.79 |
|  | Kimono | −4.18 | −5.83 |
|  | Park Scene | −5.18 | −5.78 |
| Class B Average | | −11.99 | −11.63 |
| AVERAGE | | −8.28 | −9.83 |

The method described herein shows significant coding gain with a marginal increase in decoder complexity. For example, for the case of N=2, the decoding complexity of P-slices is similar to B-slices.

Figure 4:
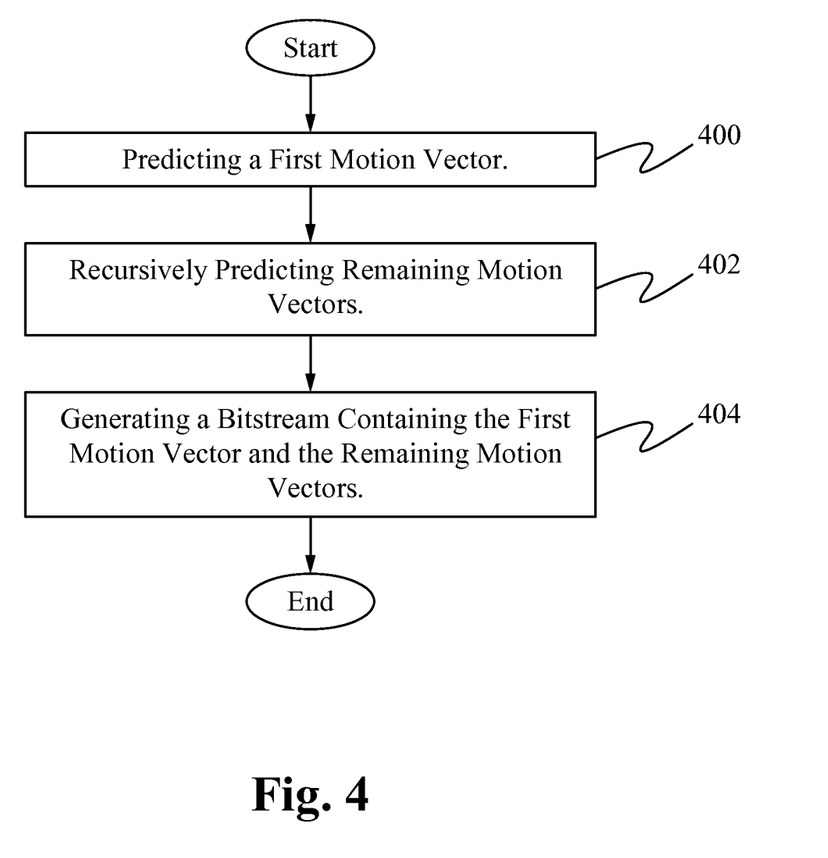
FIG. 4 illustrates a flowchart of a method of encoding an image using multi-parameter motion prediction according to some embodiments.

FIG. 4 illustrates a flowchart of a method of encoding an image using multi-parameter motion prediction according to some embodiments. In the step 400, a first motion vector is predicted from a list of motion vector predictors. In the step 402, remaining motion vectors are recursively predicted using differential prediction. In the step 404, a bitstream containing the first motion vector and the remaining motion vectors is generated. In some embodiments, only the differences of the remaining motion vectors are included in the bitstream. In some embodiments, fewer or additional steps are included in the method.

Figure 5:
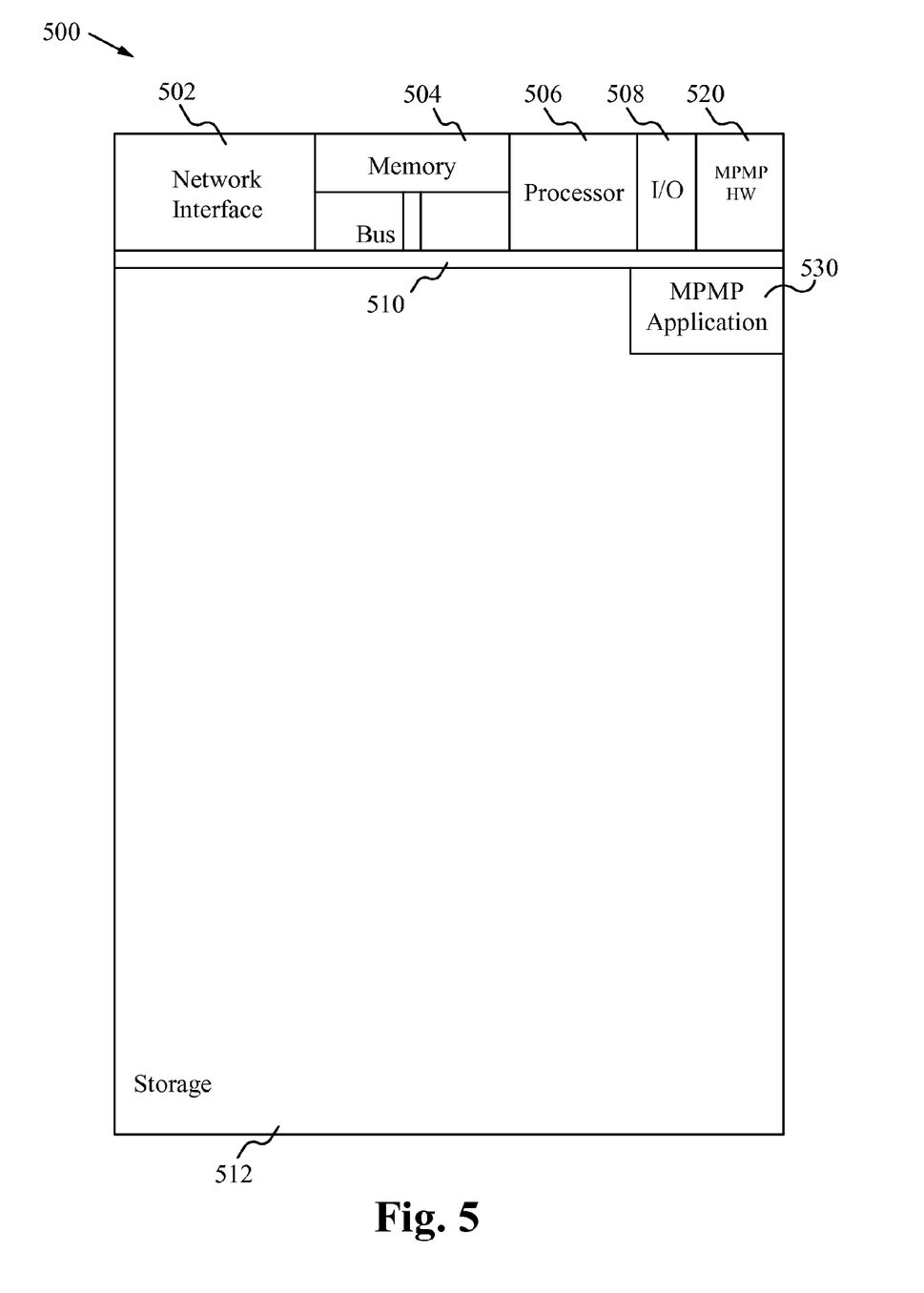
FIG. 5 illustrates a block diagram of an exemplary computing device configured to implement the multi-parameter motion prediction method according to some embodiments.

FIG. 5 illustrates a block diagram of an exemplary computing device 500 configured to implement the multi-parameter motion prediction method according to some embodiments. The computing device 500 is able to be used to acquire, store, compute, process, communicate and/or display information such as images and videos. For example, a computing device 500 is able to acquire and store a video. The multi-parameter motion prediction method is able to be used during or after acquiring the video, or when displaying the video on the device 500. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. In some embodiments, the hardware structure includes multiple processors and other hardware to perform parallel processing. Multi-parameter motion prediction application(s) 530 used to perform the multi-parameter motion prediction method are likely to be stored in the storage device 512 and memory 504 and processed as applications are typically processed. More or less components shown in FIG. 5 are able to be included in the computing device 500. In some embodiments, multi-parameter motion prediction hardware 520 is included. Although the computing device 500 in FIG. 5 includes applications 530 and hardware 520 for implementing the multi-parameter motion prediction method, the multi-parameter motion prediction method is able to be implemented on a computing device in hardware, firmware, software or any combination thereof. For example, in some embodiments, the multi-parameter motion prediction applications 530 are programmed in a memory and executed using a processor. In another example, in some embodiments, the multi-parameter motion prediction hardware 520 is programmed hardware logic including gates specifically designed to implement the encoding method.

In some embodiments, the multi-parameter motion prediction application(s) 530 include several applications and/or modules. Modules such as a first prediction module for predicting a first motion vector from a list of motion vector predictors, a remaining prediction module for predicting remaining motion vectors recursively using differential prediction and a generating module for generating a bitstream containing the first motion vector and the remaining motion vectors are able to perform the functions described herein. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device.

To utilize the multi-parameter motion prediction method, a user acquires a video/image such as on a digital camcorder, and while or after the video is acquired, or when displaying the video, the multi-parameter motion prediction method is automatically used for inter coding each image of the video, so that the video is encoded efficiently while maintaining quality. The multi-parameter motion prediction method occurs automatically without user involvement. The video is also able to be decoded to be displayed using a similar method.

In operation, multi-parameter motion prediction is used to encode and decode images such as frames of a video. The multi-parameter motion prediction method allows efficient use of multiple parameters when predicting motion.

SOME EMBODIMENTS OF MULTI-PARAMETER MOTION FOR EFFICIENT PREDICTION IN VIDEO COMPRESSION

1. A method of encoding an image using multi-parameter motion prediction programmed in a controller in a device comprising:
   a. predicting a first motion vector from a list of motion vector predictors;
   b. predicting remaining motion vectors recursively using differential prediction; and
   c. generating a bitstream containing the first motion vector and the remaining motion vectors.
2. The method of clause 1 wherein using differential prediction includes computing motion vector differences.
3. The method of clause 1 wherein the first motion vector is selected in an RD-optimized fashion.
4. The method of clause 1 wherein if the list contains more than one motion vector, an index of the predictor is coded into the bitstream along with a motion vector difference.
5. The method of clause 1 wherein the remaining motion vectors include only remaining motion vector differences.
6. The method of clause 1 further comprising ordering the motion vectors in the bitstream in an order to reduce an overhead from side information.
7. The method of clause 1 wherein all motion vectors use a same reference frame whose index is signaled for each list.
8. The method of clause 1 wherein a number of available motion vectors for each prediction unit is transmitted in the bitstream.
9. The method of clause 1 wherein a maximum number of motion vectors allowed is pre-defined and fixed.
10. The method of clause 1 wherein the multi-parameter motion uses multiple motion vectors from one image to construct a motion-compensated prediction image.
11. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
12. An apparatus for encoding an image using multi-parameter motion prediction programmed in a controller in a device comprising:
   a. a first prediction module for predicting a first motion vector from a list of motion vector predictors;
   b. a remaining prediction module for predicting remaining motion vectors recursively using differential prediction; and
   c. a generating module for generating a bitstream containing the first motion vector and the remaining motion vectors.
13. The apparatus of clause 12 wherein using differential prediction includes computing motion vector differences.
14. The apparatus of clause 12 wherein the first motion vector is selected in an RD-optimized fashion.

15. The apparatus of clause 12 wherein if the list contains more than one motion vector, an index of the predictor is coded into the bitstream along with a motion vector difference.
16. The apparatus of clause 12 wherein the remaining motion vectors include only remaining motion vector differences.
17. The apparatus of clause 12 further comprising an ordering module for ordering the motion vectors in the bitstream in an order to reduce an overhead from side information.
18. The apparatus of clause 12 wherein all motion vectors use a same reference frame whose index is signaled for each list.
19. The apparatus of clause 12 wherein a number of available motion vectors for each prediction unit is transmitted in the bitstream.
20. The apparatus of clause 12 wherein a maximum number of motion vectors allowed is pre-defined and fixed.
21. The apparatus of clause 12 wherein the multi-parameter motion uses multiple motion vectors from one image to construct a motion-compensated prediction image.
22. The apparatus of clause 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
23. A device comprising:
    a. a memory for storing an application, the application for:
        i. predicting a first motion vector from a list of motion vector predictors;
        ii. predicting remaining motion vectors recursively using differential prediction; and
        iii. generating a bitstream containing the first motion vector and the remaining motion vectors; and
    b. a processing component coupled to the memory, the processing component configured for processing the application.
24. The device of clause 23 wherein using differential prediction includes computing motion vector differences.
25. The device of clause 23 wherein the first motion vector is selected in an RD-optimized fashion.
26. The device of clause 23 wherein if the list contains more than one motion vector, an index of the predictor is coded into the bitstream along with a motion vector difference.
27. The device of clause 23 wherein the remaining motion vectors include only remaining motion vector differences.
28. The device of clause 23 further comprising ordering the motion vectors in the bitstream in an order to reduce an overhead from side information.
29. The device of clause 23 wherein all motion vectors use a same reference frame whose index is signaled for each list.
30. The device of clause 23 wherein a number of available motion vectors for each prediction unit is transmitted in the bitstream.
31. The device of clause 23 wherein a maximum number of motion vectors allowed is pre-defined and fixed.
32. The device of clause 23 wherein the multi-parameter motion uses multiple motion vectors from one image to construct a motion-compensated prediction image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding an image using multi-parameter motion prediction programmed in a controller in a device comprising:
    a. predicting a first motion vector from a list of motion vector predictors;
    b. predicting remaining motion vectors recursively using differential prediction; and
    c. generating a bitstream containing the first motion vector and the remaining motion vectors, wherein a quantity of available motion vectors for each prediction unit is transmitted in the bitstream using truncated unary binarization to represent the quantity of available motion vectors.
2. The method of claim 1 wherein using differential prediction includes computing motion vector differences.
3. The method of claim 1 wherein the first motion vector is selected in an RD-optimized fashion.
4. The method of claim 1 wherein if the list contains more than one motion vector, an index of the predictor is coded into the bitstream along with a motion vector difference.
5. The method of claim 1 wherein the remaining motion vectors include only remaining motion vector differences.
6. The method of claim 1 further comprising ordering the motion vectors in the bitstream in an order to reduce an overhead from side information.
7. The method of claim 1 wherein all motion vectors use a same reference frame whose index is signaled for each list.
8. The method of claim 1 wherein a maximum number of motion vectors allowed is pre-defined and fixed.
9. The method of claim 1 wherein the multi-parameter motion uses multiple motion vectors from one image to construct a motion-compensated prediction image.
10. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
11. An apparatus for encoding an image using multi-parameter motion prediction programmed in a controller in a device comprising:
    a. a first prediction module for predicting a first motion vector from a list of motion vector predictors;
    b. a remaining prediction module for predicting remaining motion vectors recursively using differential prediction; and
    c. a generating module for generating a bitstream containing the first motion vector and the remaining motion vectors, wherein a quantity of available motion vectors for each prediction unit is transmitted in the bitstream using truncated unary binarization to represent the quantity of available motion vectors.
12. The apparatus of claim 11 wherein using differential prediction includes computing motion vector differences.
13. The apparatus of claim 11 wherein the first motion vector is selected in an RD-optimized fashion.

14. The apparatus of claim 11 wherein if the list contains more than one motion vector, an index of the predictor is coded into the bitstream along with a motion vector difference.

15. The apparatus of claim 11 wherein the remaining motion vectors include only remaining motion vector differences.

16. The apparatus of claim 11 further comprising an ordering module for ordering the motion vectors in the bitstream in an order to reduce an overhead from side information.

17. The apparatus of claim 11 wherein all motion vectors use a same reference frame whose index is signaled for each list.

18. The apparatus of claim 11 wherein a maximum number of motion vectors allowed is pre-defined and fixed.

19. The apparatus of claim 11 wherein the multi-parameter motion uses multiple motion vectors from one image to construct a motion-compensated prediction image.

20. The apparatus of claim 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

21. A device comprising:
  a. a memory for storing an application, the application for:
    i. predicting a first motion vector from a list of motion vector predictors;
    ii. predicting remaining motion vectors recursively using differential prediction; and
    iii. generating a bitstream containing the first motion vector and the remaining motion vectors, wherein a quantity of available motion vectors for each prediction unit is transmitted in the bitstream using truncated unary binarization to represent the quantity of available motion vectors; and
  b. a processing component coupled to the memory, the processing component configured for processing the application.

22. The device of claim 21 wherein using differential prediction includes computing motion vector differences.

23. The device of claim 21 wherein the first motion vector is selected in an RD-optimized fashion.

24. The device of claim 21 wherein if the list contains more than one motion vector, an index of the predictor is coded into the bitstream along with a motion vector difference.

25. The device of claim 21 wherein the remaining motion vectors include only remaining motion vector differences.

26. The device of claim 21 further comprising ordering the motion vectors in the bitstream in an order to reduce an overhead from side information.

27. The device of claim 21 wherein all motion vectors use a same reference frame whose index is signaled for each list.

28. The device of claim 21 wherein a maximum number of motion vectors allowed is pre-defined and fixed.

29. The device of claim 21 wherein the multi-parameter motion uses multiple motion vectors from one image to construct a motion-compensated prediction image.

* * * * *